C. DE C. MOLL AND G. A. MOLL.
DEMOUNTABLE RIM FOR WHEELS.
APPLICATION FILED JUNE 18, 1918.
1,310,364.
Patented July 15, 1919.
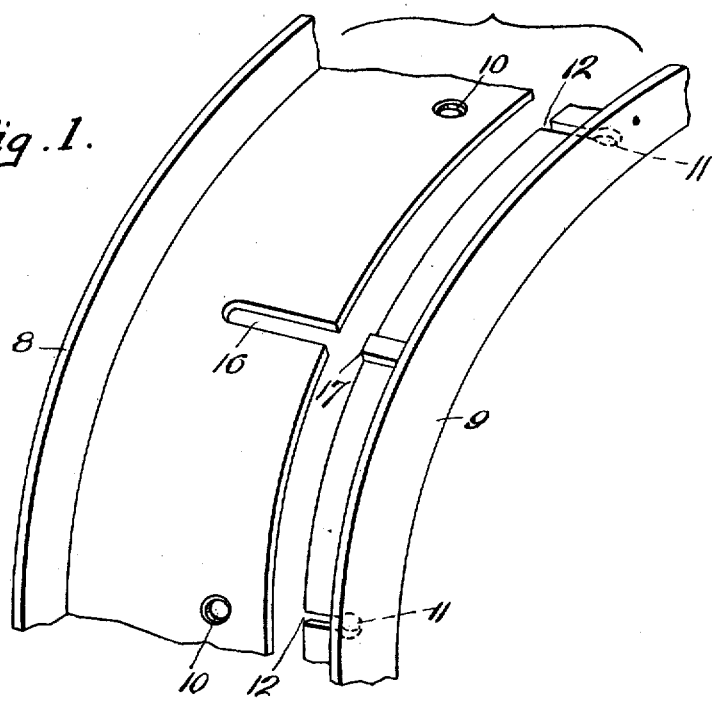
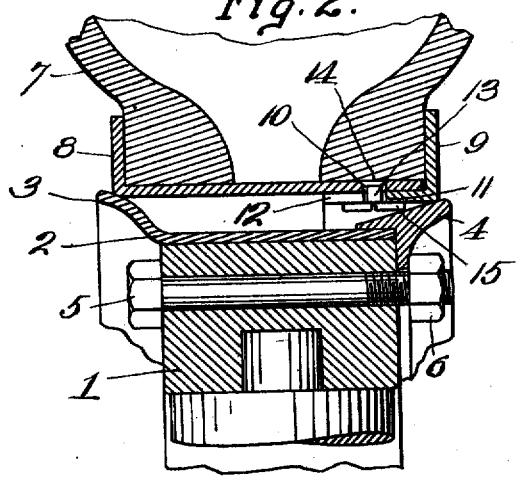
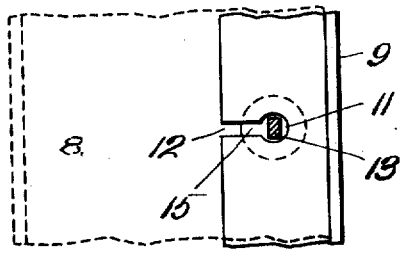
INVENTORS:
Chester DeClinton Moll and
George A. Moll.
BY
ATTORNEY

UNITED STATES PATENT OFFICE.

CHESTER DE CLINTON MOLL AND GEORGE A. MOLL, OF OLATHE, KANSAS.

DEMOUNTABLE RIM FOR WHEELS.

1,310,364.　　　　　Specification of Letters Patent.　　Patented July 15, 1919.

Application filed June 18, 1918. Serial No. 240,599.

*To all whom it may concern:*

Be it known that we, CHESTER DE CLINTON MOLL and GEORGE A. MOLL, citizens of the United States, residing at Olathe, in the county of Johnson and State of Kansas, have invented certain new and useful Improvements in Demountable Rims for Wheels, of which the following is a specification.

This invention relates to demountable rims for wheels, and more especially to wheels equipped with pneumatic tires, and our primary object is to produce a sectional ring for quick and easy disconnection from or application to a tire casing. Heretofore it has been necessary to pry the casing off the casing ring preliminary to replacement of such casing by a new one or to the repair of the inner tube, and it has likewise involved considerable labor and the loss of some time to replace the casing on the ring. This work and loss of time are avoided by the use of a ring such as is contemplated herein, as the sections of the ring can be disconnected from each other and from the casing to give access to the inner tube or for the repair or replacement of the casing, the sections of the ring being reassembled with respect to each other and the casing easily and quickly.

With the object specified in view, the invention consists in certain novel and peculiar features of construction and combination of parts as hereinafter described and claimed; and in order that it may be fully understood reference is to be had to the accompanying drawing, in which:

Figure 1, is a fragmentary perspective view of the sections of a casing ring embodying the invention.

Fig. 2, is a radial section of a part of a pneumatic tired wheel embodying the invention.

Fig. 3, is an external elevation of a fragment of the ring, the inner member being shown in dotted lines, the outer member in full lines, and one of the fastening devices in section.

In the said drawing, 1 indicates the felly of a wheel of any suitable type, 2 is the customary metal rim upon the wheel, provided at one side with the customary flange 3.

At the opposite or outer side of the wheel from flange 3 is the customary removable cam ring 4, and to secure the latter in place the usual felly bolts 5 and clamping nuts 6 are employed. All of the parts described as well as the casing 7, and the inner tube, not shown, are of common and well known construction.

The casing 7 is fitted on a ring, which, in this instance, is composed of an inner flange member 8 and an outer flange member 9, the former corresponding in width to the inner part of the casing. The member 9 is narrow and overlaps the outer edge member 8, the flange of member 9 fitting against the outer face of the casing in the same manner that the flange of member 8 fits against the inner edge of the casing for the purpose of preventing separating movement of the inner edges of the casing, it being understood in this connection that the flanges 8 and 9 may be shaped for use with clencher tires or may be of any other shape without departing from the principle of construction herein involved.

The ring member 8 is provided near its inner edge with a plurality of countersunk holes 10, which register with holes 11 in member 9, when the members are in operative relation, and extending inwardly from the holes 11 through the inner edges of member 9 and slots 12, the holes 11 and slots 12 constituting keyhole slots.

13 are flattened bolts extending rotatably through holes 10, and provided at their upper ends with pivotal heads 14 to fit in the countersunk portions of said holes. The bolts are provided at their lower or inner ends with slotted heads 15, so that they may be readily turned with a screw driver. The bolts are flattened, as shown clearly in Fig. 3, so that when turned to the proper position they may pass through the slots 12, after which they are rotated about a quarter revolution so as to make it impossible for them to repass through said slots owing to the fact that their major axis is of greater length than the width of said slots, as shown clearly in Fig. 3.

When the members or sections of the ring are separated the casing 7 can be easily and quickly slipped on or off member 8, the latter being provided with a transverse slot 16 for the accommodation of the valve plug, not shown, of the inner tube, and in order that the inflation of the tire shall not distend the inner tube through slot 16, the member 9 is provided with an external rib 17 for closing said slot 16 from the inner edge of the member 8 to the said valve plug. Assuming that the casing has been fitted upon member 8, it will be apparent that the member 9 is slipped telescopically within the member 8 to the position shown by Fig. 2, the bolts 13 being, of course, first set so that they may pass through the slots 12 into the holes 11, the rib 17 at the same time entering the slot 16 as above referred to. When the members 8 and 9 are thus arranged, a screw driver or the like is employed to turn the fastening bolts as hereinbefore explained. The casing mounted upon said rib, is then slipped over the said wheel, and the cam ring 4 is fitted in place in the customary manner so that in conjunction with flange 3 it shall form a support for the sectional ring and casing mounted thereon. After the cam ring is fitted in place, it is hammered home and is then secured in position by means of the clamping nuts 6 screwed upon the ends of the bolts 5.

The removal of the casing and sectional rim from the wheel and the separating of the first-named parts from each other is effected by a reversal of the operation above described.

From the above description it will be apparent that we have produced a demountable rim for wheels, embodying the features of advantage set forth as desirable in the statement of the object of the invention, and which is susceptible of modification in form and detail construction without departing from the spirit and scope of the appended claims.

We claim:

1. In a demountable rim for wheels, a wheel, a pneumatic tire casing, a ring encircled by and supporting the casing and comprising a pair of members fitting telescopically together and provided in their overlapping portions with registering holes, one of the members having slots of less width than the diameter of the holes extending from said holes through one edge of said member, rotatable bolts extending through the registering holes to secure the members together; said bolts being flattened so that when turned edgewise they can pass through said slots, and means for securing the casing-carrying ring upon the wheel.

2. In a demountable rim for wheels, a ring for carrying a pneumatic tire casing, comprising two members for fitting telescopically together and provided at their opposite or remote edges with outwardly projecting flanges and provided in their overlapping edges with registering holes, the holes in one member being of key-hole slot type and extending through the adjacent edge of said member, and headed bolts extending through said registering holes, the body portions of the bolts being substantially elliptical in cross section and of such proportion that when turned crosswise of the key-hole slots they cannot pass through the latter but when turned in line with said slots they can pass therethrough.

In testimony whereof we affix our signatures.

CHESTER DE CLINTON MOLL.
GEORGE A. MOLL.

Copies of this patent may be obtained for five cents each, by addressing the "Commissioner of Patents, Washington, D. C."